United States Patent [19]

Bruyninckx et al.

[11] 4,448,938

[45] May 15, 1984

[54] MODIFIED ISOCYANATE COMPOSITIONS, THEIR PRODUCTION AND USES FOR POLYURETHANE MANUFACTURE

[75] Inventors: Alphonse E. Bruyninckx; Martin F. Brooks, both of Everberg, Belgium; David Thorpe, Manchester, England

[73] Assignee: Imperial Chemical Industries PLC, London, England

[21] Appl. No.: 100,877

[22] Filed: Dec. 6, 1979

[30] Foreign Application Priority Data

Dec. 11, 1978 [GB] United Kingdom ............... 47954/78

[51] Int. Cl.³ ............................................. C08G 18/28
[52] U.S. Cl. ...................................... 525/457; 528/67; 528/69; 528/73; 528/76
[58] Field of Search ....................... 528/73, 67, 69, 76; 525/457

[56] References Cited

U.S. PATENT DOCUMENTS 4,031,026 6/1977 Ibbotson ............................... 528/73
4,125,545 11/1978 Kroplinski et al. ............... 260/404.5

FOREIGN PATENT DOCUMENTS 1483957 8/1977 United Kingdom .
1528045 10/1978 United Kingdom .

OTHER PUBLICATIONS

Cols. 1-2, 35-36 of U.S. Pat., No. 3,306,875.

*Primary Examiner*—Harold D. Anderson
*Attorney, Agent, or Firm*—Cushman, Darby & Cushman

[57] ABSTRACT

Isocyanate compositions derived from diphenylmethane diisocyanate (MDI) which are a mixture of A) the reaction product of MDI with a polyether polyol or amine of molecular weight from 600 to 10,000 and B) a uretonimine modified MDI, the weight ratio of A to B being from 19:1 to 1:1. Also polyurethanes, especially elastomers prepared therefrom.

4 Claims, No Drawings

MODIFIED ISOCYANATE COMPOSITIONS, THEIR PRODUCTION AND USES FOR POLYURETHANE MANUFACTURE

TECHNICAL FIELD

This invention relates to isocyanates which are derivatives of diphenylmethane diisocyanate, to their preparation and to their use in the manufacture of polyurethanes.

BACKGROUND

Diphenylmethane diisocyanate is a commercially available isocyanate, used extensively in polyurethane production. In its usual commerical form the so-called "pure" material consists of the 4,4'-isomer with up to 30% of the 2,4'-isomer and small amounts of others, such as the 2,2'-isomer. The pure 4,4'-isomer melts at 42° C. and the pure 2,4'-isomer melts at 36° C. Thus the usual commercial material, produced by crystallisation and or distillation is a "solid", melting at about 40° C. This is inconvenient for many applications, since it must be melted before use. Also, in storage, conversion to uretidione derivatives gives rise to solution problems on remelting.

Various methods of overcoming the problem handling solid diphenylmethane diisocyanate have been proposed which usually involve reaction of the isocyanate groups to produce uretonimines, for example British Pat. Nos. 1,356,851 and 1,476,088 or with certain hydroxy-compounds to produce urethane prepolymers (for example British Pat. Nos. 1,377,676 and 1,378,975).

DESCRIPTION OF THE INVENTION

We have now devised a system based on such techniques which not only gives liquid diphenylmethane diisocyanate compositions of low temperature stability, but also gives polyurethane polymers with advantageous properties.

Our invention provides an isocyanate composition derived from diphenylmethane diisocyanate comprising:-
  A. the product of reaction of diphenylmethane diisocyanate with a polyether of an alcohol or an amine of molecular weight 600 to 10,000;
  B. a uretonimine-modified diphenylmethane diisocyanate; the weight ratio of A to B being from 19:1 to 1:1.

The first component (A) is a product of reacting diphenyl methane diisocyanate with a polyether of molecular weight from 600 to 10,00. The polyether may be based on di- or polyfunctional polyols or amines or mixtures thereof. Examples are polyethers of ethylene glycol, glycerol, sorbitol, propylene glycols, trimethylolpropane, pentaerythritol, ethylene diamine, aniline, mono-di- and triethanolamines.

The polyols or amines are alkoxylated with alkylene oxides or other alkoxylating agents, such as propylene oxide ethylene oxide, butylene oxide or epichlorhydrin, under known conditions to give polyether derivatives which may be mixed polyethers, or may be in the form of random or block co-polymers. The polyethers may be polyfunctional. Preferably, the polyether has a molecular weight in the range 1,500 to 8,000. We prefer to use polyether polyols of functionality between 2 and 4.

The amounts of isocyanate and polyether polyol used in the first component are preferably 10–55% by weight of polyol, more preferably 20 to 45% by weight polyol, the difference to 100% being diphenylmethane diisocyanate.

The second component (B) is a uretonimine-modified diphenylmethane diisocyanate. Such derivatives may be made by converting a proportion of the isocyanate groups in diphenylmethane diisocyanate to carbodiimide groups and then allowing the carbodiimide group to react with further isocyanate groups to give uretonimine groups.

The conversion of isocyanate groups to carbodiimide groups and the further reaction to give uretonimine groups is known and is for example described in British Pat. No. 1,356,851. Process steps may include addition of 0.1% to 10% by weight of isocyanate of a catalyst such as a trialkyl phosphate heating at 40° C. to 220° C. several hours and then allowing the carbodiimide so formed to react with unconverted isocyanate.

In order to permit this reaction to proceed to near completion it is normally necessary to allow the isocyanate/carbodiimide reaction mixture to stand for a time at room temperature for the uretonimine-forming reaction to take place. Conversion to uretonimine may not go to absolute completion and there sometimes remains in the composition a small amount of carbodiimide which is not converted to uretonimine despite the presence of excess isocyanate groups.

In manufacturing diphenylmethane diisocyanate uretonimine group-containing derivatives for the compositions of this invention it is preferred that about 3.5-35% of the isocyanate groups in diphenylmethane diisocyanate are converted to carbodiimide groups by heating the diisocyanate in the presence of a catalyst and then cooling the mixture, with deactivation of the catalyst if desired or necessary using an acidic material, and then allowing the carbodiimide groups to react further to give the uretonimine derivative. Thus there is obtained diphenylmethane diisocyanate containing a uretonimine group-containing derivative thereof.

Components A and B may be prepared separately and mixed together. They are used in weight ratios A:B of 19:1 to 1:1, more preferably 9:1 to 2:1.

The mixture of A and B may be made by partly converting diphenylmethane diisocyanate to the uretonimine derivative, then reacting with polyether polyol to give the desired mixture. Amounts of materials used are selected according to the ratios required in the product. The conversion to uretonimine is arrested by the addition of an acidic material such as thionyl chloride or tin tetrachloride.

Additional free isocyanate can be present. Thus as an option, diisocyanate to the extent of up to 50% by weight of the amount of components A and B may be added to the composition. Further diphenylmethane diisocyanate containing 1 to 60% of the 2,4' isomer may be present.

Additional polyisocyanates, to give a total functionality up to 2.3 may be added to the composition. For example, if a polyisocyanate with a functionality of 2.8 is added, it will be used in an amount about equal to the combined weight of A and B.

In general, when stored alone, uretonimine modified diphenyl methane diisocyanate will begin to form crystals within 1 day at 0° C. An isocyanate modified with low molecular weight glycol ether may crystallize after 1 day at 0° C. With compositions according to the present invention, products are crystal-free for more than 10 days at 0° C. The isocyanate compositions according to the present invention are useful for the preparation of a wide range of polyurethane and related materials by reaction with substances containing active hydrogen groups. Elastomers prepared from the isocyanate blends according to the present invention show less variation of flexural modulus with temperature than do similar elastomers prepared from isocyanates modified with low (less than 100) molecular weight polyols.

EXEMPLICATION OF THE INVENTION

The invention is further illustrated by the following Examples. The abbreviation MDI is used to denote 4,4' diphenylmethane diioscyanate.

The following materials are trademarked products available from Imperial Chemical Industries Ltd. The trademarks are owned by Imperial Chemical Industries Ltd.

DALTOCEL T32/75 polyol

Daltocel T32/75 is a polyether polyol prepared from glycerol and propylene oxide and ethylene oxide, of hydroxyl value 32 and molecular weight 5300.

DALTOCEL F3001

Daltocel F3001 is a polyether polyol prepared from dipropylene glycol and propylene and ethylene oxides, of hydroxyl value 30 and molecular weight 3750.

EXAMPLE 1

Preparation of Comonent AI

A high molecular weight polyol-modified MDI is prepared from Daltocel T32/75 polyol and diphenylmethane 4,4'-diisocyanate containing 1.5% of the 2,4'-diisocyanate.

Pure 4,4'-MDI containing 1.5% of the 2,4'-MDI isomer (40.25 Kg.) is charged molten to a 50 liter steel reactor equipped with stirrer and nitrogen feed inlet. Dry nitrogen is maintained onto the surface of the liquid throughout the preparation. Benzoyl chloride (8.63 mls, 0.015% on the total batch weight) is charged and the contents of the reactor are heated to 80±2° C.

Daltocel T32/75 (29.75 kg, which is 42.5% of the batch weight) is added at this temperature over 40 minutes. Occasional cooling is required. The material is stirred for a further 1 ½ hours at this temperature in order to complete the reaction and cooled to ambient temperature. The product is a mobile colourless to yellow liquid of 18.25% NCO which partially crystallizes on standing overnight at room temperature.

Preparation of Component B

A commercially available uretonimine modified MDI (SUPRASEC VM 20 isocyanate from Imperial Chemical Industries, "SUPRASEC" is a trademark) was used. This type of modified MDI can be prepared by procedures described in British Pat. Nos. 1,356,851 or 1,476,088. For example, pure MDI can be heated with 5 parts weight per million MDI of 1-phenyl, 3-methylphospholene oxide for 100°-150° C. for several hours. 50 ppm thionyl chloride is then added to de-activate the catalyst. To the product was added fresh MDI to adjust the isocyanate content to 29% and the mixture allowed to stand for several days to give a product referred to as component B.

The following blends of the above prepolymer AI and component B are made up using the following procedure.

Component AI is heated up to 80° C. under a nitrogen atmosphere and with stirring component B is added as quickly as possible. The blends are stirred at 80° C. over ½ hr. and cooled down to 35–40° C. before discharge to suitable containers.

Three compositions are prepared, referred to as compositions 1A, 1B and 1C.

| Composition | 1A | 1B | 1C |
|---|---|---|---|
| Component AI (parts by weight) | 90 | 70 | 50 |
| Component B (parts by weight) | 10 | 30 | 50 |
| Blend isocyanate value % | 19.4 | 21.6 | 23.8 |
| Blend viscosity (CS) | 345 | 190 | 100 |

EXAMPLE 2

Preparation of Component A2

A prepolymer is prepared from Daltocel F3001 polyol and MDI containing 1.5% of the 2,4'-diisocyanate isomer.

MDI (98.5% 44'diisocyanate isomer, 1.5% 2,4-diisocyanate isomer) 39.6 kg is charged molten to a 50 liter steel reactor equipped with stirrer and nitrogen feed inlet. Dry nitrogen is maintained onto the surface of the liquid throughout the preparation. Benzoyl chloride (8.63 mls), 0.015% on the total batch weight) is charged and the contents of the reactor are heated to 80±2° C. Daltocel F3001 (30.38 kg.) which is 43.4% of the batch weight is added at 80±2° C. over 40 minutes. After a further 1 ½ hrs to complete the reaction the batch is cooled to room temperature. The product is a mobile pale straw coloured clear liquid of 17.96% NCO which partially crystallizes on standing overnight at room temperature.

The following blends of the above prepolymer (component A2) and uretonimine modified MDI (component B) are made up using the procedure previously described.

| Composition | 2A | 2B | 2C |
|---|---|---|---|
| Parts by weight | | | |
| Component A2 | 90 | 70 | 50 |
| Component B | 10 | 30 | 50 |
| Blend isocyanate value (%) | 19.1 | 21.4 | 22.65 |
| Blend viscosity (CS) | 297 | 150 | 78 |

The low temperature characteristics of the isocyanate blends according to the invention are compared with the individual components of the blends and with an isocyanate composition based on (a) a low molecular weight glycol modified MDI prepolymer and (b) the uretonimine modified MDI component B. For comparative purposes there are also shown the characteristics of a blend of component B with an isocyanate modified with a low molecular weight polyol. The average molecular weight of the polyol was 91. This modified isocyanate is referred to as composition 1D. It was prepared from MDI 91.7 points by weight, made up to 100 by addition of mixed glycols of average molecular weight 91 by the procedure described in British Pat. No. 1,379,975.

The following table I gives the results of storage of different temperatures.

Explanation of symbols:

S5, S10, etc. = Solid after day 5, 10, etc.
X1, X2, etc. = Starts crystallizing at day 1,2, etc.
X30+ = crystal-free more than 30 days
Xind = crystal-free indefinitely
NT = not tested

TABLE I

| LOW TEMPERATURE STORAGE CHARACTERISTICS | | | |
|---|---|---|---|
| Storage Temperature | 25° C. | 10° C. | 0° C. |
| Example I | | | |
| Component A1 | S5, X1 | NT | NT |
| Component B | X ind | S10, X2 | S5,X1 |
| Composition IA | X ind | X 30+ | X 10+ |
| Composition IB | X ind | X 30+ | X 20+ |
| Composition IC | X ind | X 30+ | X 20+ |
| Example 2 | | | |
| Component A2 | S5, X1 | NT | NT |
| Composition 2A | X ind | X 30+ | X 10+ |
| Composition 2B | X ind | X 30+ | X 20+ |
| Composition 2C | X ind | X 30+ | X 20+ |
| Composition with a blend of component B and composition ID (equal parts by weight) | X ind | S15, X2 | S10, XI |

TABLE II

FORMULATIONS FOR ELASTOMERS

Conversion to elastomers

The three compositions 1A to IC, prepared as in Example 1, were used to prepare polyurethane elastomers.

The amount of the various contents and catalysts is given in Table 2. Procedures are otherwise conventional.

The physical properties of the elastomers are compared in Table 3.

TABLE 3

| | ELASTOMER FORMULATION | | | Comparison |
|---|---|---|---|---|
| COMPONENT | W | X | Y | Z |
| Daltocel* T32/75 | 13.4 | 28.23 | 43.34 | 82.4 |
| 14 Butane Diol | 19.9 | 21.56 | 23.45 | 26.36 |
| Dabco* 33LV | 0.4 | 0.4 | 0.45 | 0.58 |
| DBTDL | 0.027 | 0.029 | 0.032 | 0.04 |
| Water | 0.076 | 0.078 | 0.087 | 0.165 |
| ISOCYANATE | 100 | 100 | 100 | 100 |
| ISOCYANATE COMPOSITION | IA | IB | IC | ID |

| PHYSICAL PROPERTIES OF THE DERIVED ELASTOMERS | | | | |
|---|---|---|---|---|
| | ELASTOMERS | | | |
| PROPERTY | W | X | Y | Z |
| Density(Overall) Kg M$^{-3}$ | 1115 | 1055 | 1105 | 1120 |
| Tensile Strength | 19600 | 18600 | 18500 | 23,000 |

TABLE 3-continued

| KN M$^{-2}$ | | | | |
|---|---|---|---|---|
| Elongation at Break (%) | 190 | 150 | 93 | 150 |
| Hardness (Shore D) | 64 | 67 | 66 | 63 |
| Angle tear NM$^{-1}$ | 113,000 | 104,000 | 104,000 | — |
| Flexural Modulus MN M$^{-2}$ (−30° C.) | 850 | 900 | 1080 | 950 |
| Flexural Modulus MN M$^{-2}$ (+20° C.) | 360 | 370 | 470 | 320 |
| Flexural Modulus MN M$^{-2}$ (+65° C.) | 200 | 200 | 220 | 100 |
| Ratio Flex. Modulus −30/+65 | 4.3/1 | 4.5/1 | 4.9/1 | 9.5/1 |

DABCO 33LV is a 33% Solution of Diazabicyclooctane commonly called "triethylene diamine" in dipropylene glycol.
*trademarks
DBTDL isdibutyltindilaurate.

An isocyanate blend (Composition ID) which has been prepared by modification of pure 44' diphenyl methane diisocyanate with low molecular weight polyols (average molecular weight 91) followed by blending with uretonimine modified pure MDI (Component B) is used for comparative purposes. It can be seen that considerable improvement is shown in the flexural modulus change with temperature between the products of the invention and that of the comparative isocyanate blend, as shown by Elastomer Z.

We claim:

1. A liquid isocyanate composition which has low temperature stability such that when stored it remains crystal-free for more than 10 days at 0° C., said composition being derived from diphenylmethane diisocyanate and comprising:

(A) the product of reaction of 90–45% by weight of diphenylmethane diisocyanate with 10–55% by weight of a polyether of an alcohol or an amine of molecular weight from 600 to 10,000, the indicated percentages by weight being based on the weight of the reaction product; and a uretonimine modified diphenylmethane diisocyanate, the weight ratio of A to B being from 19:1 to 1:1.

2. An isocyanate composition according to claim 1 made by a process in which diphenylmethane diisocyanate is partly converted to the uretonimine derivative, then a polyether polyol or amine is added, the degree of conversion and the amount of polyether polyol or amine added being chosen so as to give the ratio stated in claim 1.

3. An isocyanate composition comprising a composition according to claim 1 to which has been added up to 50% of its weight of diphenyl methane diisocyanate, containing from 1 to 60% weight of the 2,4' isomer.

4. An isocyanate composition according to claim 1 together with sufficient polyisocyanate of a sufficient functionality such that the resultant composition has an isocyanate functionality of 2.3.

* * * * *